Oct. 23, 1956  M. W. STEWART  2,767,947
PIPE HOLDER
Filed July 19, 1954

Milas W. Stewart
INVENTOR.

BY *Clarence A. O'Brien*
*and Harvey B. Jacobson*
Attorneys

2,767,947

PIPE HOLDER

Milas W. Stewart, Farmersville, Tex.

Application July 19, 1954, Serial No. 444,191

1 Claim. (Cl. 248—55)

The present invention relates to a pipe holder and more particularly relates to a pipe holder and supporting stand for supporting a portion of a pipe section remote from an end of the section which is to be threaded or otherwise worked upon.

The primary object of the invention is to provide a pipe holder which is adapted to rollingly support and guidingly retain pipe sections of varying diameters.

A further object of the invention is in the provision of a pipe holder which is exceedingly simple in construction, requiring no special parts in its assembly or use while providing a durable, efficient rolling support for pipe sections.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
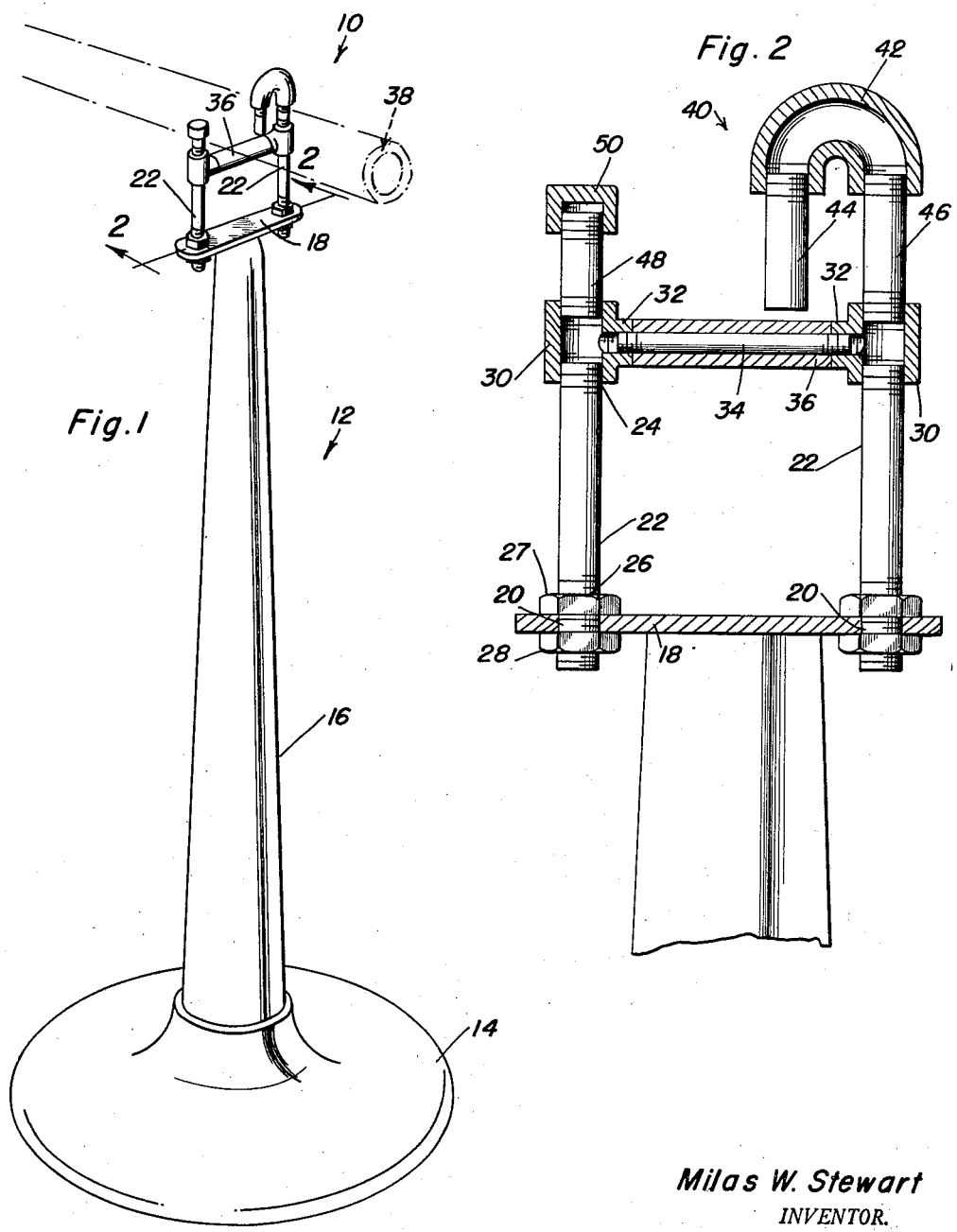
Figure 1 is a perspective view of the pipe holder and the stand therefor in position for supporting a section of pipe, such a section being illustrated in phantom outline.
Figure 2 is a cross-sectional view of the holder taken substantially along the plane of section line 2—2 of Figure 1.

Referring to the drawings in detail, there is shown a pipe holder 10 mounted on a supporting stand 12, the supporting stand comprising a flat base 14 having a vertically upwardly tapered standard rising therefrom.

The holder 10 consists of an elongated, flat, substantially rectangular plate 18 which is rigidly secured intermediate its ends to the upper end of the standard 16.

Adjacent its ends, the plate 18 is provided with apertures 20.

A pair of tubular posts 22 formed of small diameter pipe sections are each threaded at their upper and lower ends as at 24 and 26 respectively. The threaded lower end portions of the posts 22 are received in the openings 20 of the plate 18. Nuts 27 and 28 are threaded onto the threaded lower end portions 26 of each of the posts 22, nut 27 abutting the top surface of plate 18 and nut 28 abutting the bottom surface of the plate 18 to rigidly clamp the lower end of each post 22 to the plate 18.

The posts 22 rise vertically from the plate 18 and are disposed in spaced, parallel relation to one another. On the threaded upper end 24 of each post a collar 30 is threadedly mounted. Each collar 30 has a tubular, internally threaded boss 32 thereon. The collars 30 are threaded on the upper ends of the posts 22 in such a manner that the bosses 32 open toward one another. A small diameter cylindrical rod 34 threaded at its opposite ends bridges the space between the bosses 32 and is threadedly secured at its ends within the bars of the bosses. Sleeve 36 concentrically surrounds the shaft 34 and is rotatable thereon to form a roller for rollingly supporting a portion of the pipe section as designated in phantom outline by the numeral 38 of Figure 1.

Pipe guiding extensions 40 rise vertically from the collars 30 to guidingly retain the pipe sections 38 for longitudinally movable support on the roller 36.

One of these extensions 40 comprises an inverted U-shaped member consisting of a bight portion and parallel legs 44 and 46. The legs 44 and 46 are small diametered pieces of pipe whereas bight portion 42 is a semi-circular tubular element having internally threaded end portions into which the upper ends of the legs 44 and 46, respectively, are threadedly received.

The lower end of the leg 46 is threadedly received in one of the collars 30, leg 46 forming in effect a longitudinal extension of one of the legs 22. By rotating the leg 46 within the collar 30, the parallel offset leg 44 may be moved into a position above tthe roller 36 and between the posts 22. Conversely, by further rotation, the leg 44 may be moved out of its overlying relation with the roller 36. The purpose of this construction is to enable the roller to longitudinally retain pipe sections of varying outside diameters with a minimum of transverse slippage on the roller 36.

The other vertical guide extension consists of a small tubular pipe section 48 rising from the other collar 30 and serving as a longitudinal extension of the opposite leg 22. The extension leg 48 is threaded at its upper and lower ends, the lower end being threaded into its associated collar 30 and the cap 50 being threaded on the upper end of the leg 48.

With this construction, by rotation of the leg 46, the spacing between the legs 44 and 48 may be increased or decreased at the will of the user of the holder to longitudinally guidingly support varying diameter pipe sections. Further, the elements necessary in the construction of the holder are those ordinarily found in any plumbing shop, necessitating no special tools nor their assembly for use.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A pipe support for rollingly supporting a portion of a pipe section, said support comprising a flat, elongated plate, a pair of posts attached at their lower ends to said plate and rising vertically therefrom, a collar on the top of each of said posts having a tubular boss thereon, a shaft extending between and threaded at its ends into said bosses, a sleeve rotatingly received on said shaft and constituting a rolling support for a pipe section, a vertical guide extension projecting from each of said collars for retaining a pipe section against transverse sliding movement on the roller, one of said guide extensions comprising an inverted U-shaped member having a bight portion and a pair of parallel legs depending therefrom, one of said legs being rotatably received in one of said collars, said U-shaped member being swingable upon rotation of said one leg.

References Cited in the file of this patent

UNITED STATES PATENTS

| 813,588 | Rollins | Feb. 27, 1906 |
| 2,726,859 | Dolamore | Dec. 13, 1955 |